Dec. 19, 1950  A. C. HOWARD  2,534,772
SUSPENSION SYSTEM FOR TRACTORS AND LIKE VEHICLES
Filed June 15, 1948  2 Sheets-Sheet 1

Arthur Clifford Howard
Inventor

By Cushman, Darby & Cushman
Attorneys

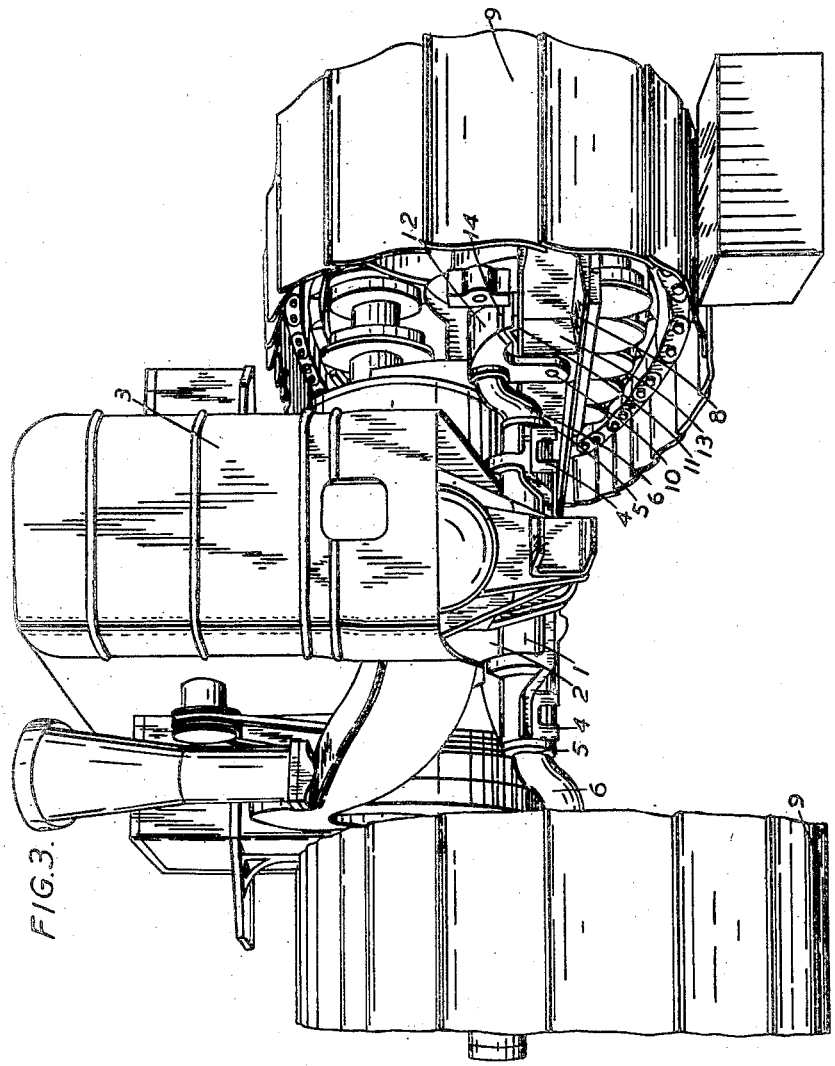

Patented Dec. 19, 1950

2,534,772

UNITED STATES PATENT OFFICE 2,534,772

SUSPENSION SYSTEM FOR TRACTORS AND LIKE VEHICLES

Arthur Clifford Howard, Leeds, England

Application June 15, 1948, Serial No. 33,014
In Great Britain June 30, 1947

2 Claims. (Cl. 305—9)

This invention relates to suspension systems for tractors and like vehicles.

The chief object of the present invention is to provide a new or improved method of mounting the track frames relative to the main chassis or components of the tractor whereby the correct alignment of the tracks will be positively maintained and the tracks and track frames will oscillate in a true horizontal plane.

According to the invention the forward ends of the track frames are suspended from the tractor or tractor chassis by means of a cross shaft cranked forward at one end and rearward at the other end. The cranked ends of the shaft may be connected by means of short connecting rods or links to the track frames as near to the centre lines of the track frames as is practicable to relieve the track frames from torsion strain.

It will be appreciated that the cross-shaft, connecting rods or linkage will be constructed sufficiently rigid to support the track frames from both lateral movement and torsion.

As the crank on one side of the tractor must be placed further forward than on the other side, thus bringing one mounting further away from the rear or fixed mounting of the track frame, it is necessary for the length of the throw of the crank to be in proportion to its distance from the fixed anchorage.

The cross-shaft will be carried in bearings beneath the tractor which may be resiliently mounted thereto and if desired the connecting rods or links may be similarly mounted on the track frames. Suitable stops may be placed or formed on or adjacent the track frames to limit the oscillating movement of the track frames, and prevent any possibility of the cranks and links passing over dead centre.

In the event of the bearing of the cross-shaft of linkage to the track frames being rigidly mounted the torsion bar effect of the cross-shaft will afford the required resilience of mounting.

In order that the invention may be clearly understood and readily carried into effect the same will now be more fully described with reference to and by the aid of the accompanying drawings, in which—

Figure 3 is a perspective view of the front end of a tractor showing one track raised as when passing over an obstruction.

Figure 1:
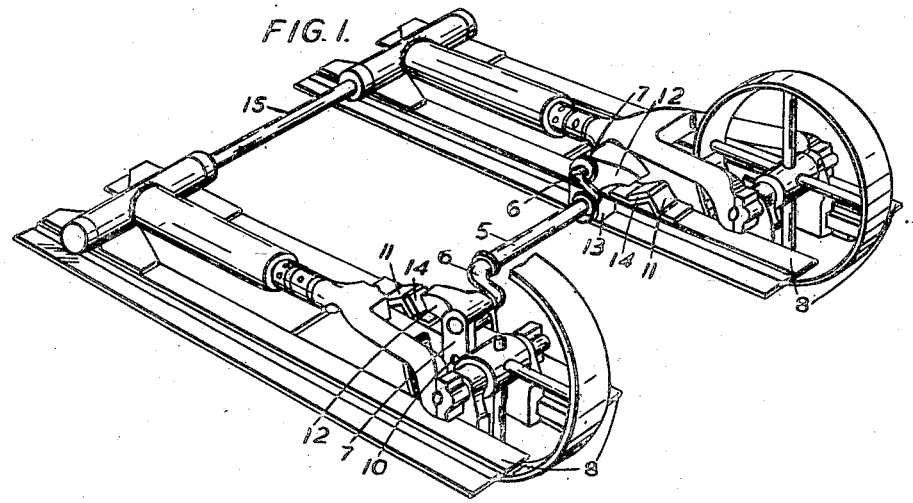
Figure 1 is a perspective view of a track frame assembly and cross shaft for supporting the front.
Figure 2:
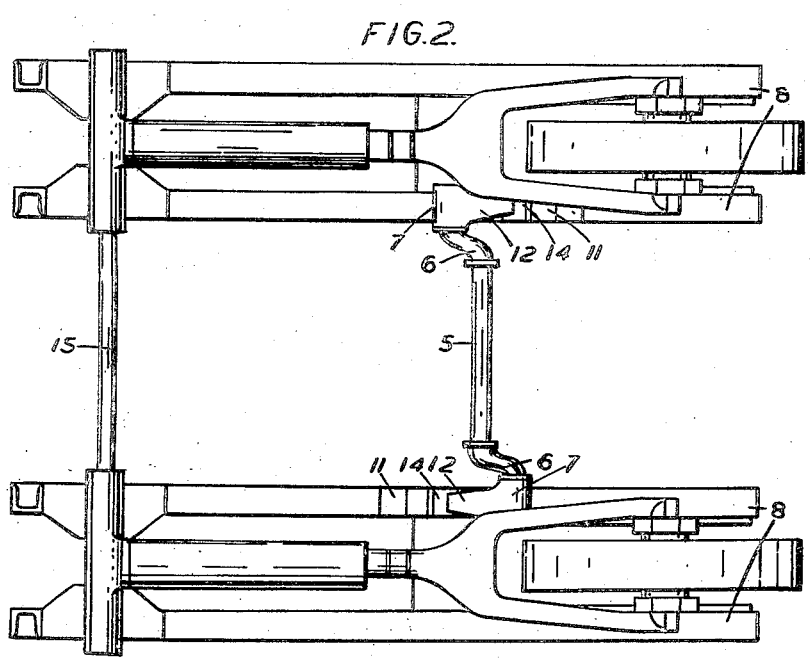
Figure 2 is a plan view of Figure 1.

Referring to the drawings, the suspension system comprises an axle bracket 1 (see Figure 3) either rigidly or resiliently secured beneath the front end 2 of the tractor 3, said axle bracket being provided with bearings 4 for a cross-shaft 5 the ends 6 of which are cranked equally and oppositely, i. e. one forwardly and the other rearwardly. The cranked ends 6 afford journals to which are secured short connecting rods or links 7 connected to the track frames 8 at main bearing blocks 13 as near the centre lines of the tracks 9 as is practicable. The connecting rods or links 7 are connected by means of link pins 10 which may, if desired, incorporate a resilient mounting.

Inclined adjustable stops 11 are secured to the track frames 8 and adapted to be engaged by an abutment or projection 12 formed in each of the connecting rods or links 7, the stops 11 being adjusted relative to the abutments or projections 12 so as to limit the maximum oscillation of track frame 8 and prevent the crank shaft main bearing blocks 13, crank pin or ends 6 and linkage connection 7 to the track frame 8 from getting in line when one side or other of the track is lifted to its extreme height.

The stops 11 may be faced with rubber of like resilient material 14 to prevent undue jarring when engaged by the abutments or projections.

This method of suspension of the front ends of the tracks 9 enables either a live or dead axle 15 to be used at the driving end of the tracks.

Also the torsional effect of the cross-shaft 5 damps the transmission of vibration to the chassis.

I claim:

1. In a suspension system for endless track vehicles, a main frame, a cross shaft connected to the main frame, said cross shaft being cranked forwardly at one end and rearwardly at the other end, a pair of spaced track frames, links connected to the track frames, said links having transverse openings into which the ends of the cross shaft are journalled, said links having projections extending in opposite directions, and said track frames having stops mounted thereon arranged to engage said projections for limiting the oscillating movement of the track frames.

2. In a suspension system for endless track vehicles, a main frame, a cross shaft connected to the main frame, said cross shaft being cranked forwardly at one end and rearwardly at the other end, a pair of spaced track frames, links connected to the track frames and extending upwardly therefrom, said links having transverse openings into which the ends of the cross shaft are journalled, said links having projections above the track frames and extending in opposite directions, and said track frames having stops mounted thereon provided with inclined surfaces arranged to engage said projections for limiting the oscillating movement of the track frames, the parts being constructed and arranged so that the crank shaft constitutes means for damping the transmission of vibration to the main frame of the vehicle.

ARTHUR CLIFFORD HOWARD.

REFERENCES CITED

The following references are of record in the file of this patent:

UNITED STATES PATENTS

| Number | Name | Date |
|---|---|---|
| 1,442,552 | Wickersham | Jan. 16, 1923 |

FOREIGN PATENTS

| Number | Country | Date |
|---|---|---|
| 507,733 | Germany | Sept. 19, 1930 |